June 27, 1967 M. E. HALE ETAL 3,328,623
SURGE ARRESTOR HAVING ELECTRODES CONTAINING
A LOW RESISTIVITY METAL
Filed March 2, 1964

INVENTORS.
MURRAY E. HALE and
ROBERT D. WRIGHT
BY

United States Patent Office 3,328,623
Patented June 27, 1967

3,328,623
SURGE ARRESTOR HAVING ELECTRODES CONTAINING A LOW RESISTIVITY METAL
Murray E. Hale, Atkinson, N.H., and Robert D. Wright, Canton, Mass., assignors to Sylvania Electric Products Inc., a corporation of Delaware
Filed Mar. 2, 1964, Ser. No. 348,663
8 Claims. (Cl. 313—217)

This invention relates generally to protective discharge devices and more particularly to an improved electrical surge arrestor.

Surge arrestor assemblies are well known in the art and are in general usage. In operation they are very similar, if not equivalent, to devices called lightning arrestors and spark gap discharge devices, the purpose of each being to protect telephone lines, communication lines and equipment from damage due to electrical potentials which may be induced into the lines by lightning or other causes. FIG. 1 shows in schematic form the electrical equivalent of such a device. Each of a pair of line electrodes 14 and 15 is connected to its respective communication line or telephone line 10 and 11. A third electrode 16, separated from the pair of line electrodes by a small gap, is connected to a ground return path. The gap between the line electrodes and the ground electrode prevents the flow of current between the line electrodes and the ground electrode so long as the voltage potential across the gap is less than a predetermined value, commonly referred to as the breakdown potential of the device. When the electrical potential across the gap exceeds the breakdown potential, the gas in the gap is ionized, producing a discharge current which flows from the line electrodes to the ground electrode, thereby passing the induced electrical charge to ground and preventing the induced charge from reaching and damaging the equipment attached to the lines. In general, four factors determine the breakdown potential of the device which must be exceeded before an electrical discharge occurs; the size of the gap defined by the electrodes, the structure of the confronting surfaces of the electrodes, the gas within the gap defined by the electrodes, and the pressure of the gas within the gap. For the device to be reliable, these four factors must remain relatively constant even though the device is subjected to repeated arc discharges.

The gas within the gap and the pressure of the gas within the gap of the surge arrestor are controlled by enclosing the electrodes of the device within a sealed unit. However, the electrode spacing and the structure of the confronting electrode surfaces are difficult to control because of the electrode deformation which results due to the heat generated when an electrical discharge occurs. For example, when carbon is used as the electrode material, the carbon builds up into small conical points or flakes on the surface of the electrode when a discharge occurs. Eventually, this causes the electrodes to "short" together rendering the communication lines inoperative. When metal is employed as the electrode material, the heat generated when the discharge occurs may be sufficient to cause the metal to vaporize. As the vaporized metal condenses, one of two possible conditions results; the condensing metal may build up on the electrode surface and eventually cause the electrodes to short, or the metal may be displaced from the electrode surface thereby increasing the gap between the electrodes. Neither of these conditions is tolerable, since in the first instance the communication lines are rendered inoperative, and in the second instance the breakdown potential required to cause an arc may exceed the safe level for the equipment connected to the lines and as a result the equipment may be damaged.

It is therefore a principal object of this invention to provide a surge arrestor capable of maintaining constant electrical operating characteristics even though subjected to repeated arc discharges.

It is another object of this invention to provide a surge arrestor having maximum reliability and durability.

It is still another object of this invention to provide a surge arrestor which is simple in construction and of economical design.

According to the invention, a surge arrestor has its gap defined between electrodes having a composition which deforms only slightly when subjected to the heat effects of an arc discharge. The electrode material is a combination of a high refractory metal and a low resistivity metal with the melting point of the high refractory metal being substantially greater than the melting point of the low resistivity metal. The high refractory metal strengthens the electrode structure while the low resistivity metal, because of its high conductivity, minimizes the heat generated during the arc discharge. The electrodes are treated with an etchant which attacks the low resistivity metal, but not the high refractory metal, to form a depletion in the confronting surfaces of the electrodes. Such electrodes contained in a controlled atmosphere of an inert gas at reduced pressure, produce a highly reliable surge arrestor, which is simple in construction.

The foregoing and other objects, features and advantages of the invention, and a better understanding of its construction will become apparent from the following detailed description taken in conjunction with the accompanying drawings, in which.

Figure 1:
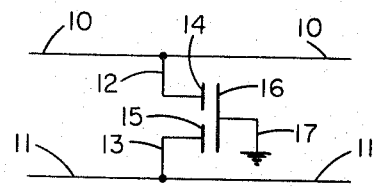
FIG. 1 is a schematic diagram of a surge arrestor, to which reference has already been made.
Figure 2A:
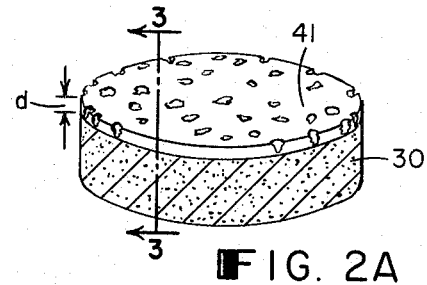
FIG. 2A is an enlarged view of the electrode 30 shown in FIG. 2.
Figure 2:
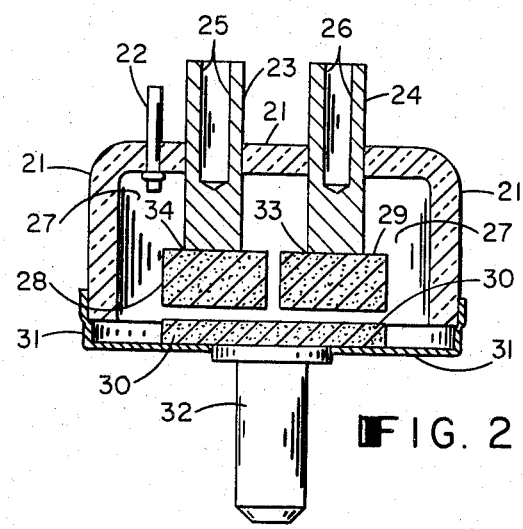
FIG. 2 is an elevation cross-sectional view of one embodiment of the surge arrestor of the invention.

Referring now to FIG. 2, the surge arrestor of the invention includes a pair of input studs 23 and 24, to the inner ends of which are connected a pair of line electrodes 28 and 29, respectively. The input studs are formed with coaxial holes 25 and 26 into which leads from the pair of communication or telephone lines are adapted to be inserted. In a preferred embodiment, the input studs 23 and 24 are formed of a tellurium-copper composition and are secured to their respective electrodes by a suitable brazing technique at junctions 34 and 33. The gap of the surge arrestor is formed between the pair of line electrodes 28 and 29, and a ground return electrode 30. The ground return electrode is secured to a suitable brazing technique to a stud 32, which may also be formed of a tellurium-copper mixture. The line electrodes 28 and 29 pass through and are secured to a cup-shaped member 21, which preferably is formed of a ceramic material. A metal shell 31, preferably of a nickel-iron composition, is secured to the stud 32 and electrode 30, the combination thereof forming the base of the surge arrestor. The metal shell 31 is appropriately secured to the cup-shaped ceramic member 21 and the resulting structure is air-tight. An evacuation tubulation 22 protrudes through the aforementioned cup-shaped ceramic member and provides a means for evacuating the device, and subsequently adding an inert gas such as argon to the interior 27 of the device. In a preferred embodiment the argon gas within the device is kept at a pressure between 100 mm. Hg and 250 mm. Hg.

An important feature of the invention is the electrode material and the preparation of the confronting surfaces of the electrodes 28, 29 and 30. In a preferred embodiment, the electrodes are composed of a copper-tungsten material which is approximately 20% copper and 80% tungsten by volume, and may be formed by one of two alternative methods. The first method consists of a pressing and sintering operation, wherein copper and tungsten powders are first mixed together and the resultant mixture compressed under pressure at a temperature above the melting point of copper, but below the melting point of tungsten. The second method involves an infiltration process, wherein a tungsten block is first formed by sintering tungsten powder to form a porous block, and then, at a temperature below the melting point of tungsten, copper is melted and poured onto the porous tungsten block, thereby filling the pores of the block. After forming the block by either of the above or some similar method, it is cut to the desired shape. The methods thus far described for forming the electrode blocks are well known to the art and no claim is made by applicants to these processes. However, copper-impregnated tungsten electrodes do not provide reliable operation, since after repeated discharges copper "globules" form on the confronting surfaces of the electrodes as a result of the copper boiling and/or vaporizing due to the heat generated in the arc discharge. Eventually, the confronting surfaces of the electrodes will short to one another thereby rendering the device inoperative.

To provide an electrode which gives reliable operation, the electrode is immersed in suitable solution of nitric acid for a specified time. Since nitric acid attacks copper, but does not attack tungsten, a surface depletion of the copper results with the copper being removed from the surface of the electrode to a predetermined depth, preferably about five mils, thereby forming the electrode surface 41 shown greatly magnified in FIG. 3. The voids 42 correspond to the areas in which the copper has been removed, and the remaining projections 43 of the electrode surface consists mainly of tungsten.

Figure 3:
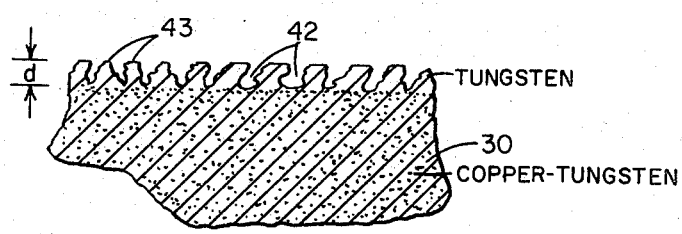
FIG. 3 is an enlarged fragmentary cross-sectional view taken along line 3—3 of FIG. 2A.

The operation of the invention and its advantages over the prior art will be better understood from the following detailed description with reference to FIGS. 2 and 3. Assuming that sufficient electrical charge has been induced into the pair of communication lines to cause the electrical potential existing between the pair of line electrodes 28 and 29 and the ground electrode 30 to exceed the breakdown potential of the surge arrestor, the argon gas 27 within the gap becomes ionized and becomes a conductor, causing an arc discharge to occur across the gap. The discharge current passes through the ground electrode 30 and stud 32 to ground. The current through the electrodes generates heat within the device in addition to the heat generated by the release of energy as the argon gas molecules become ionized. The total heat generated may be sufficient to melt and/or vaporize the copper within the electrodes, since the copper has a relatively low melting point. However, because of the electrode structure the effect of vaporization becomes an advantage in the functioning of the surge arrestor of the invention. As is well known, the phenomena of vaporization produces a cooling effect. Since the vaporization of the copper occurs below the surface of the electrodes 30, at the depth $d$, the resulting cooling effect occurs within the electrode thereby causing the copper to condense before reaching the surface of the electrode, and preventing the buildup of copper "globules" on the electrode surface. In addition, the cooling due to vaporization keeps the temperature in the area of the arc discharge below the melting point of tungsten, so the electrode shape is maintained with minimal distortion.

The use of the copper in the electrode in conjunction with the unique structure of the confronting surfaces of the electrodes has a further advantage. Because of the low resistivity of the copper, the arc discharge diffuses over a larger surface area of the electrodes, thereby increasing the current carrying capability of the surge arrestor, and preventing the formation of "hot spots" on the electrode surfaces which otherwise result when only a refractory metal is used as the electrode material. In addition the surface structure of the electrodes results in the surge arrestor having a lower breakdown voltage. For example, with a gap spacing between the electrodes of approximately twenty mils, the breakdown potential of the surge arrestor is about four hundred volts, yet it is able to repeatedly discharge induced charges in excess of one hundred and twenty coulombs.

From the foregoing description it will be realized that repeated arc discharges have a minimal effect on the electrical characteristics of the surge arrestor of the invention thereby overcoming the disadvantages of prior art devices. While the effect of vaporization is detrimental to prior art devices, the unique electrode structure of the present surge arrestor utilizes vaporization to advantage. Because electrode deformation is minimal, the close tolerance on the spacing of the electrodes is easily maintained. As a consequence, the surge arrestor of the invention is simple in design, exhibits high reliability and is economical in construction.

It will be obvious to one skilled in the art that variations may be made without departing from the spirit of the invention. For example, while the preferred embodiment suggests the use of the high refractory metal tungsten with the low resistivity metal copper as the electrode material it is understood that other high refractory metals used in conjunction with a suitable low resistivity metal will yield similar characteristics, providing the low resistivity metal is sufficiently depleted from the surface of the electrode. It will also be recognized that the surge arrestor may in some instances perform in a satisfactory manner when exposed to air at atmospheric pressure. While the surge arrestor of the invention has been described in the preferred embodiment as a three terminal device, it is readily apparent that it will function as a two terminal device as, for example, when it is desired to protect only one communication line. It is, therefore, intended that the invention not be limited to the specifics of the preceding description of one preferred embodiment, but rather to embrace the full scope of the following claims.

What is claimed is:

1. A surge arrestor including two electrodes which define a spark gap therebetween, each of said electrodes being formed of a body of a high refractory porous material having a low resistivity metal contained in the pores thereof but removed from the confronting surfaces of the electrodes to a predetermined depth, the low resistivity metal being readily vaporizable with respect to said refractory material to provide evaporative cooling below the arcing surface of said electrodes upon occurrence of an arc discharge.

2. The surge arrestor according to claim 1 wherein said high refractory material is tungsten and said low resistivity metal is copper in the proportions of approximately 20% copper and 80% tungsten by volume.

3. A surge arrestor comprising a sealed envelope containing an inert gas at a predetermined pressure and two electrodes within said envelope which define a spark gap therebetween, each of said electrodes being formed of a body of a high refractory porous material having a low resistivity metal contained in the pores thereof but being removed from the confronting surfaces of said electrodes to a predetermined depth, the low resistivity metal being readily vaporizable with respect to said refractory material to provide evaporative cooling below the arcing surface of said electrodes upon occurrence of an arc discharge.

4. The surge arrestor according to claim 3 wherein said high refractory material is tungsten and said low resistivity metal is copper in the proportions of approximately 20% copper and 80% tungsten by volume.

5. A surge arrestor including first, second and third electrodes, a first gap being defined between said first and third electrodes, a second gap being defined between said second and third electrodes, each of said first, second and third electrodes being formed of a body of high refractory, porous material having a low resistivity metal contained in the voids thereof but removed from the confronting surfaces of said electrodes to a predetermined depth, the low resistivity metal being readily vaporizable with respect to said refractory material to provide evaporative cooling below the arcing surface of said electrodes upon occurrence of an arc discharge.

6. Apparatus according to claim 5 wherein said high refractory material is tungsten and said low resistivity metal is copper in the proportions of approximately 20% copper and 80% tungsten by volume.

7. A surge arrestor including a sealed envelope containing an inert gas at a predetermined pressure, first, second and third electrodes positioned within said envelope to define a first gap between said first and third electrodes and a second gap between said second and third electrodes, said electrodes being formed of a body of high refractory, porous material having a low resitivity metal contained in the pores thereof but removed from the confronting surfaces of each of said electrodes to a predetermined depth, the low resistivity metal being readily vaporizable with respect to said refractory material to provide evaporative cooling below the arcing surface of said electrodes upon occurrence of an arc discharge.

8. The surge arrestor according to claim 7 wherein said high refractory material is tungsten and said low resistivity metal is copper in the proportions of approximately 20% copper and 80% tungsten by volume.

References Cited

UNITED STATES PATENTS

| | | | |
|---|---|---|---|
| 2,996,795 | 8/1961 | Stout | 313—346.1 |
| 3,102,968 | 9/1963 | Waterton | 313—311 |

FOREIGN PATENTS 1,262,280   4/1961   France.

JAMES W. LAWRENCE, *Primary Examiner.*

STANLEY D. SCHLOSSER, *Examiner.*